(12) United States Patent
Klimczak et al.

(10) Patent No.: US 12,709,059 B2
(45) **Date of Patent: *Aug. 18, 2026**

(54) 3D PRINTING LIQUEFIER NOZZLE FLEXURE FOR IMPROVED IRONING

(71) Applicant: 3D Print Innovations, LLC, Millburn, NJ (US)

(72) Inventors: Scott Klimczak, St. Petersburg, FL (US); Luke Rodgers, St. Petersburg, FL (US); Darin Burgess, St. Petersburg, FL (US)

(73) Assignee: 3D Print Innovations, LLC

( * ) Notice: Subject to any disclaimer, the term of this patent is extended or adjusted under 35 U.S.C. 154(b) by 92 days.

This patent is subject to a terminal disclaimer.

(21) Appl. No.: 18/796,473

(22) Filed: Aug. 7, 2024

(65) Prior Publication Data

US 2024/0391168 A1 Nov. 28, 2024

Related U.S. Application Data

(63) Continuation of application No. 17/417,043, filed as application No. PCT/US2019/067334 on Dec. 19, 2019, now Pat. No. 12,076,921.

(60) Provisional application No. 62/782,065, filed on Dec. 19, 2018.

(51) Int. Cl.

| | |
|---|---|
| ***B29C 67/00*** | (2017.01) |
| ***B29C 64/209*** | (2017.01) |
| ***B29C 64/236*** | (2017.01) |
| ***B33Y 30/00*** | (2015.01) |

(52) U.S. Cl.
CPC .......... *B29C 64/209* (2017.08); *B29C 64/236* (2017.08); *B33Y 30/00* (2014.12)

(58) Field of Classification Search
CPC ... B29C 64/118; B29C 64/209; B29C 64/218; B29C 64/227; B29C 64/386; B29C 64/393
See application file for complete search history.

(56) References Cited

U.S. PATENT DOCUMENTS

| | | | | |
|---|---|---|---|---|
| 6,056,191 A * | 5/2000 | Brouillette | .............. | B23K 3/00 228/56.3 |
| 2015/0210007 A1 | 7/2015 | Durand | | |
| 2015/0276119 A1 | 10/2015 | Booker | | |
| 2016/0144563 A1 | 5/2016 | Elliott | | |
| 2017/0173891 A1 | 6/2017 | Bosveld | | |
| 2017/0291804 A1 | 10/2017 | Craft | | |

(Continued)

FOREIGN PATENT DOCUMENTS

| | | |
|---|---|---|
| CN | 1324717 A | 12/2001 |
| CN | 103974813 A | 8/2014 |

(Continued)

*Primary Examiner* — Thu Khanh T. Nguyen
(74) *Attorney, Agent, or Firm* — Riverside Law LLP

(57) ABSTRACT

An apparatus, system and method for providing a liquefier nozzle flexure to at least enable ironing of a 3D print, to thereby improve print quality. The apparatus, system and method may include: a controllable print head for providing the 3D print; a liquefier capable of liquefying deposit material for providing the 3D print; and the liquefier nozzle flexure mounted between the print head and the liquefier that allows a distance between the print head and the liquefier to vary when a resistance is encountered at a print nozzle tip.

20 Claims, 9 Drawing Sheets

(56) References Cited

U.S. PATENT DOCUMENTS

| | | | | |
|---|---|---|---|---|
| 2017/0371317 | A1 | 12/2017 | Share | |
| 2018/0001557 | A1 | 1/2018 | Buller | |
| 2018/0056391 | A1 | 3/2018 | Buller | |
| 2019/0118252 | A1* | 4/2019 | Sachs et al. | B29C 64/40 |
| 2019/0217538 | A1* | 7/2019 | Katon | B33Y 10/00 |

FOREIGN PATENT DOCUMENTS

| | | | |
|---|---|---|---|
| CN | 204414600 | U | 6/2015 |
| CN | 105328902 | A | 2/2016 |
| CN | 107379530 | A | 11/2017 |
| CN | 107599399 | A | 1/2018 |
| EP | 2996865 | A1 | 3/2016 |
| WO | 2017184002 | A1 | 10/2017 |

* cited by examiner

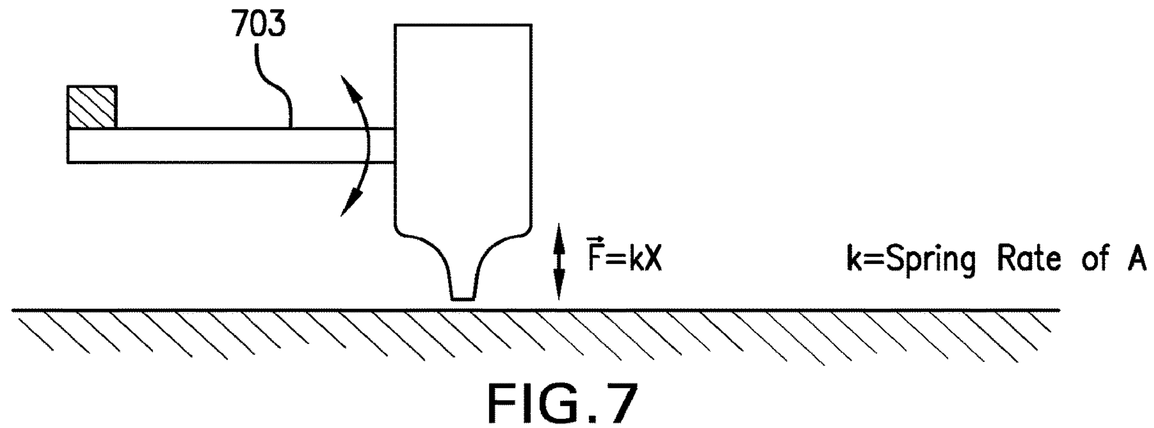
FIG.7
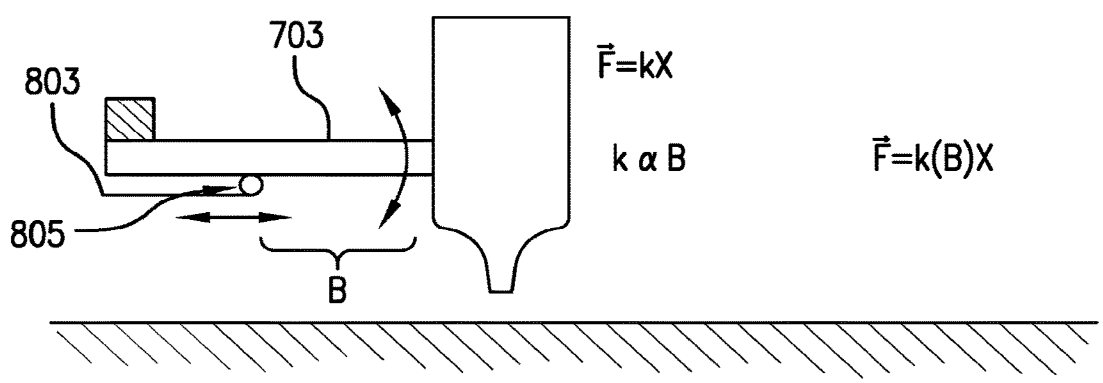
FIG.8
903
C
$\vec{f}$
$\vec{F}=kX+\vec{f}$
$\vec{f}$ = force from Actuator C
FIG.9

3D PRINTING LIQUEFIER NOZZLE FLEXURE FOR IMPROVED IRONING

CROSS-REFERENCE TO RELATED APPLICATIONS

The present application is a continuation of U.S. patent application Ser. No. 17/417,043, filed Jun. 21, 2021, which issued as U.S. Pat. No. 12,076,921 on Sep. 3, 2024, entitled: "3D Printing Liquefier Nozzle Flexure for Improved Ironing," which claims benefit to International Application PCT/US2019/067334, filed Dec. 19, 2019, entitled: "3D Printing Liquefier Nozzle Flexure for Improved Ironing," which claims priority to U.S. Provisional Application No. 62/782,065, filed Dec. 19, 2018, entitled: "3D Printing Liquefier Nozzle Flexure for Improved Ironing," the entirety of which is incorporated herein by reference as if set forth in its entirety.

BACKGROUND

Field of the Disclosure

The present disclosure relates to additive manufacturing, and, more specifically, to an apparatus, system and method of providing a 3D printing liquefier nozzle flexure for improved ironing and print quality.

Description of the Background 3D printing is a type of additive manufacturing. As opposed to subtractive manufacturing, where material is removed from a starting mass of material, additive manufacturing incrementally adds material to form an object. Additive manufacturing has many benefits and the additive manufacturing industry is growing as the technology is applied to new fields and end products.

Fused filament fabrication (FFF) is a type of additive manufacturing that utilizes filament as a starting material. The filament is typically thermoplastic, meaning that the filament is solid at ambient temperature and becomes liquefied or partially liquefied when heated to a specific temperature. FFF printers take advantage of this characteristic to sequentially deposit liquefied or partially liquefied filament in specific locations on a build plate or on a partially printed object. Upon cooling, the newly deposited filament solidifies and is part of the printed object.

FFF printers deposit material with a print head that can move in the X, Y, and Z directions. The print head typically prints a first base layer in the X and Y directions. The print head then moves up in the Z direction and prints a second layer. This process continues until a 3D printed part is complete, as dictated by print plan software. Scaffolding may be printed to support the 3D printed part, such as at areas where the part overhangs and is not supported by material underneath it. The use of scaffolding prevents overhang material from breaking off of the printed object during the 3D print.

FFF printers deposit the liquefied or partially liquefied filament in the form of a bead. To achieve optimum print quality, it is important to have a consistent filament bead deposition rate throughout the 3D print. Having a filament deposition rate that varies can undesirably lead to more filament in one section of the print and less filament in another.

FFF printing has been very successful for low speed, low throughput applications. To utilize FFF for high volume production, print speed needs to be increased. When increasing print speed, several challenges must be addressed. One of the challenges that needs to be addressed is uniform filament deposition at high print speeds. For example, when printing at high print speeds, there is a tendency for material to be deposited unevenly during fill movements.

Fill movements involve the print head moving back and forth, typically within a previously deposited perimeter of material, to fill in the center portion of a 3D printed part. When performing a fill movement, a print head deposits material in one direction and then undergoes a 180 degree turn before depositing material in an opposite direction. When performing a fill move at a high speed, non-flexing print heads tend to leave extra material at the location of the 180 degree turn. Further, non-flexing print heads tend to leave undesirable ridges which are formed as melted filament is deposited. Introducing an "ironing" effect during printing can alleviate both of the aforementioned issues.

Therefore, there is a need for an apparatus, system and method of providing a 3D printing liquefier nozzle flexure for improved ironing and print quality.

SUMMARY

The disclosure is of and includes at least an apparatus, system and method of providing a 3D printing liquefier nozzle flexure for improved ironing and print quality. The apparatus, system and method may include a flexure that allows a liquefier to move in relation to a print head. For example, a flexure may be mounted between a print head and a liquefier so that the distance between the print head and the liquefier is allowed to vary when a resistance is encountered at a nozzle tip. The resistance may be caused by the nozzle tip contacting excess deposited material or by a collision of the nozzle tip with an imperfection in a 3D printed object.

Thus, the disclosed embodiments provide an apparatus, system and method of providing a 3D printing liquefier nozzle flexure for improved ironing and print quality.

BRIEF DESCRIPTION OF THE DRAWINGS

The disclosed non-limiting embodiments are discussed in relation to the drawings appended hereto and forming part hereof, wherein like numerals indicate like elements, and in which:

FIG. 7 illustrates aspects of the disclosed embodiments.

FIG. 8 illustrates aspects of the disclosed embodiments.

FIG. 9 illustrates aspects of the disclosed embodiments.

DETAILED DESCRIPTION

Figure 1:
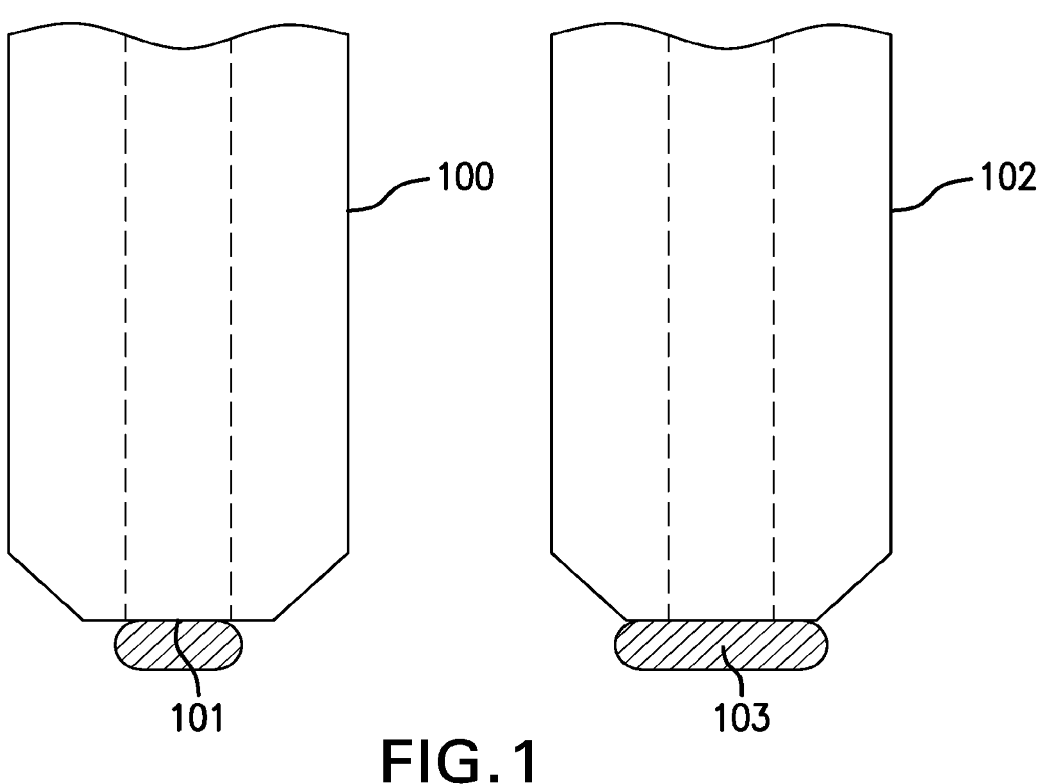
FIG. 1 is an illustration of a non-ironed filament bead and an ironed filament bead.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules and print systems are disclosed herein that may provide access to and transformation of a plurality of types of digital content, including but not limited to print plans and data streams, and the algorithms applied herein may track, deliver, manipulate, transform, transceive and report the accessed content. Described embodiments of these modules, apps, systems and methods are intended to be exemplary and not limiting.

An exemplary computing processing system for use in association with the embodiments, by way of non-limiting example, is capable of executing software, such as an operating system (OS), applications/apps, user interfaces, and/or one or more other computing algorithms, such as the print recipes, algorithms, decisions, models, programs and subprograms discussed herein. The operation of the exemplary processing system is controlled primarily by non-transitory computer readable instructions/code, such as instructions stored in a computer readable storage medium, such as hard disk drive (HDD), optical disk, solid state drive, or the like. Such instructions may be executed within the central processing unit (CPU) to cause the system to perform the disclosed operations. In many known computer servers, workstations, mobile devices, personal computers, and the like, CPU is implemented in an integrated circuit called a processor.

It is appreciated that, although the exemplary processing system may comprise a single CPU, such description is merely illustrative, as the processing system may comprise a plurality of CPUs. As such, the disclosed system may exploit the resources of remote CPUs through a communications network or some other data communications means.

In operation, CPU fetches, decodes, and executes instructions from a computer readable storage medium. Such instructions may be included in software. Information, such as computer instructions and other computer readable data, is transferred between components of the system via the system's main data-transfer path.

In addition, the processing system may contain a peripheral communications controller and bus, which is responsible for communicating instructions from CPU to, and/or receiving data from, peripherals, such as 3D printers and/or the operator interaction elements to formulate a print, as discussed herein throughout. An example of a peripheral bus is the Peripheral Component Interconnect (PCI) bus that is well known in the pertinent art.

An operator display/graphical user interface (GUI) may be used to display visual output and/or presentation data generated by or at the request of processing system, such as responsive to operation of the aforementioned computing programs/applications. Such visual output may include text, graphics, animated graphics, and/or video, for example.

Further, the processing system may contain a network adapter which may be used to couple to an external communication network, which may include or provide access to the Internet, an intranet, an extranet, or the like. Communications network may provide access for processing system with means of communicating and transferring software and information electronically. Network adaptor may communicate to and from the network using any available wired or wireless technologies. Such technologies may include, by way of non-limiting example, cellular, Wi-Fi, Bluetooth, infrared, or the like.

FIG. 1 illustrates the effect of "ironing." When producing a 3D printed object by fused filament fabrication, liquefied or partially liquefied filament may exit a nozzle 100 without an ironing effect at nozzle tip 101. In the absence of ironing, the nozzle produces a bead 101 that has a small width. Nozzle 102 illustrates what the bead width would look like if the volume of material extruded was more than the nozzle inner diameter (ID) and the layer height 105. The additional material is extruded out and ironed into a wide flat bead. If excess material is fed, the material will flatten out as illustrated in 103. If the nozzle is rigid, the distance 105 remains the same. With the flexure design, the dimension at 105 is allowed to flex up, giving room for the material to dispense into and time for the dispensed material to flow flat under the force of the flexure.

Figure 2:
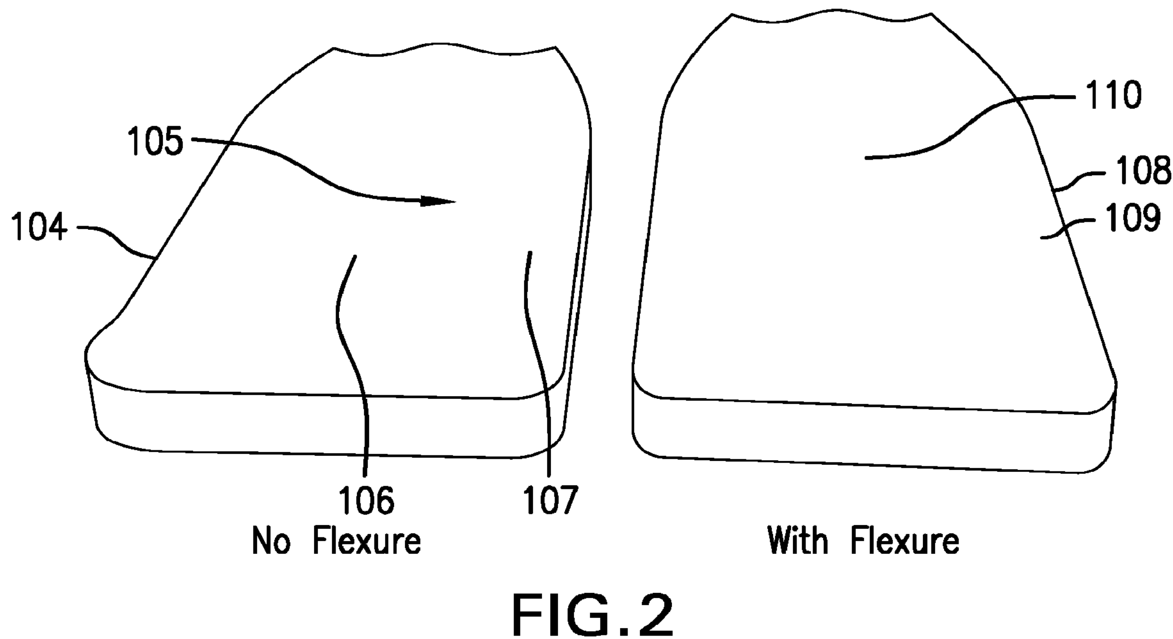
FIG. 2 is an illustration of improved print quality when printing with a nozzle flexure, compared to print quality when printing without a nozzle flexure.

At high print speeds, for example at 160 mm/sec, there is a visually observable difference in part appearance when printing with and without a flexure. FIG. 2 shows that the part 104 that was printing without a flexure has more noticeable ridges 105 and also has a noticeable lack of material in the center 106 of the part 104. Without a flexure, the extra material from a very quick 180-degree move was left at the turn around points 107. In contrast, the part 108 that was printed with a flexure installed is much flatter at the 180 degree turn around points 109. Further, more material was deposited in the middle 110 of the part, as evidenced by the fact that there was more ironing in the middle 110 of the part 108.

Figure 3:
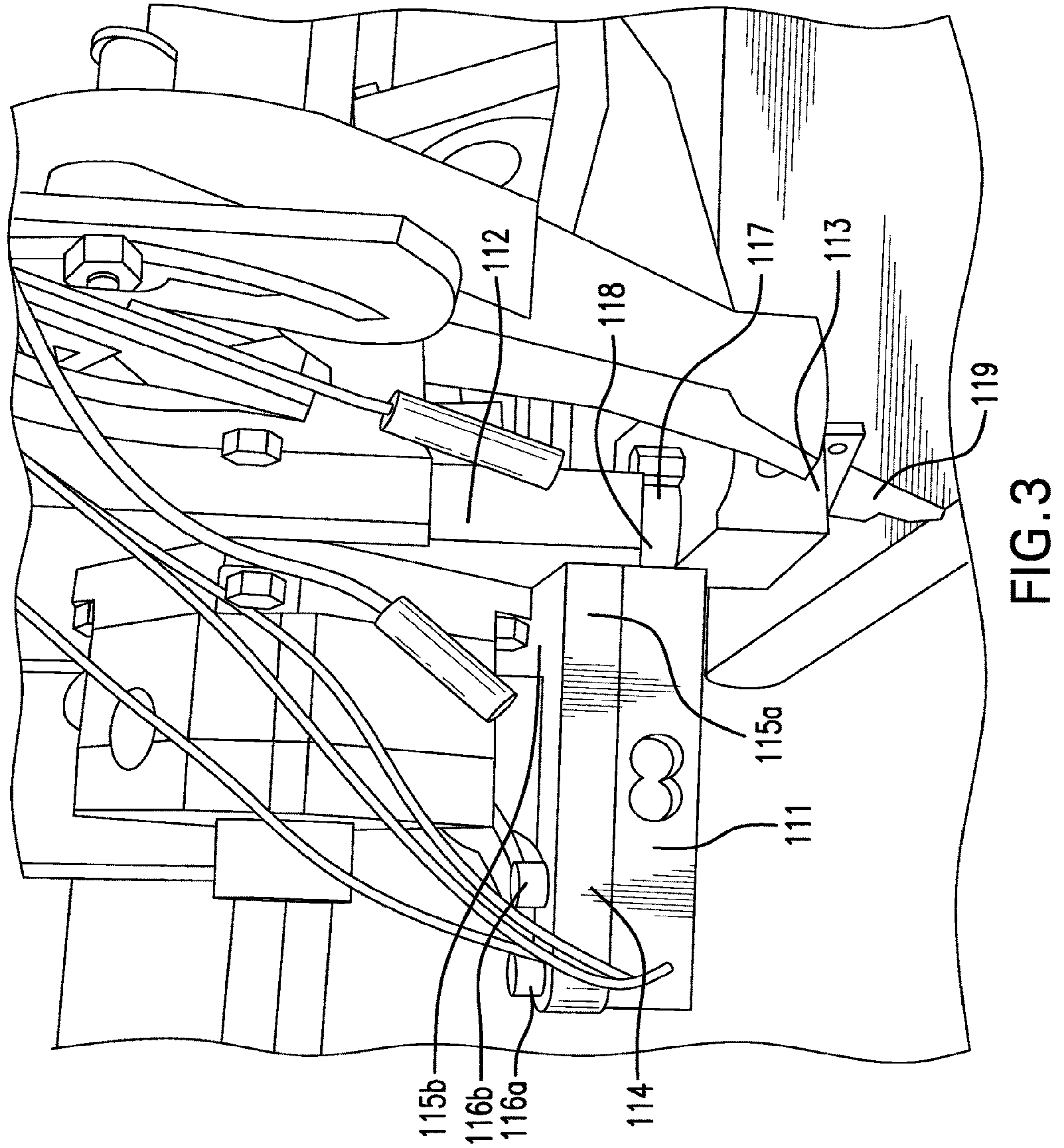
FIG. 3 is an illustration of a nozzle flexure installed between a 3D printer print head and a liquefier.

FIG. 3 shows a nozzle flexure 111 installed between a 3D printer print head 112 and a liquefier 113. The nozzle flexure 111 may be a load cell or it may be any other flexible material known to the skilled artisan.

As shown in FIG. 3, a flexure mount 114 may be mounted to the print head 112. Flexure mount 114 may be connected to print head 112, for example by connections 115*a* and 115*b*. A flexure 111 may be connected to the flexure mount 114 by one or more connections. For example, a flexure 111 may be connected to the flexure mount 114 by flexure mount connections 116*a* and 116*b* on a second side thereof which is distal to the liquefier 113.

A liquefier mount 117 may be connected to the flexure 111 at liquefier mount connection 118 on a first side of flexure 111. A liquefier 113 may be connected to the liquefier mount 117 via the liquefier mount connection 118 extending from a first side of flexure 111, which is proximal to the liquefier 113. The liquefier 113 may be connected to a nozzle 119. The nozzle 119 may move further away from and closer to the print head 112 when the nozzle 119 encounters resistance or lack thereof. For example, the resistance may be caused by the nozzle tip contacting excess deposited material or by a collision of the nozzle tip with an imperfection in a 3D printed object. The flexure 111 may pivot at the flexure mount connections 116*a* and 116*b* mounted through the flexure mount 114 to flexure 111 on the top side of flexure 111 as shown in FIG. 3.

Figure 4:
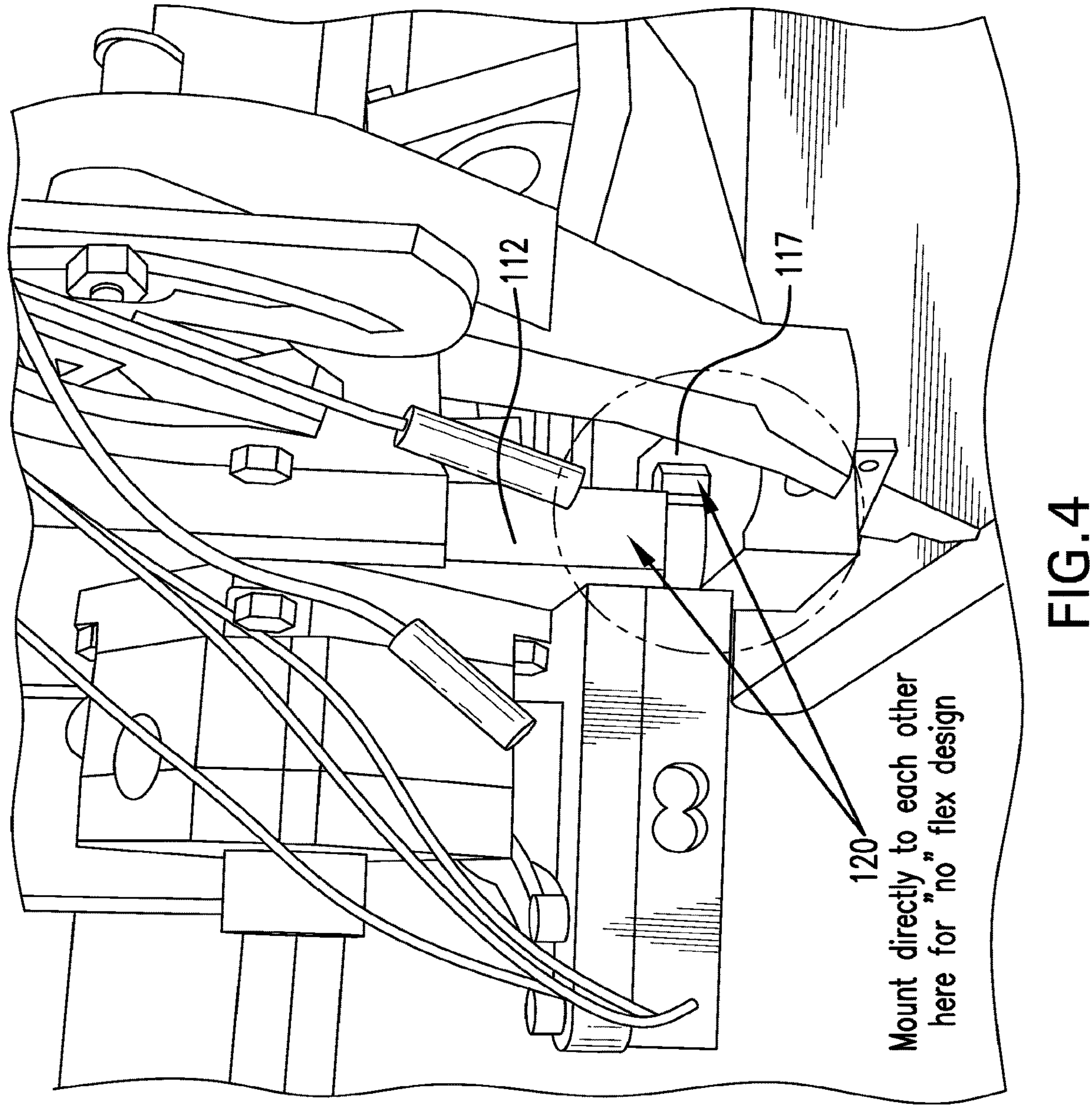
FIG. 4 is an illustration of a nozzle configured for a no flex design.

The nozzle 119 may be set at a fixed distance from the print head 112 by fastening the nozzle mount 117 to the print head 112 with a rigid connection at location 120. This configuration is shown in FIG. 4.

Figure 5:
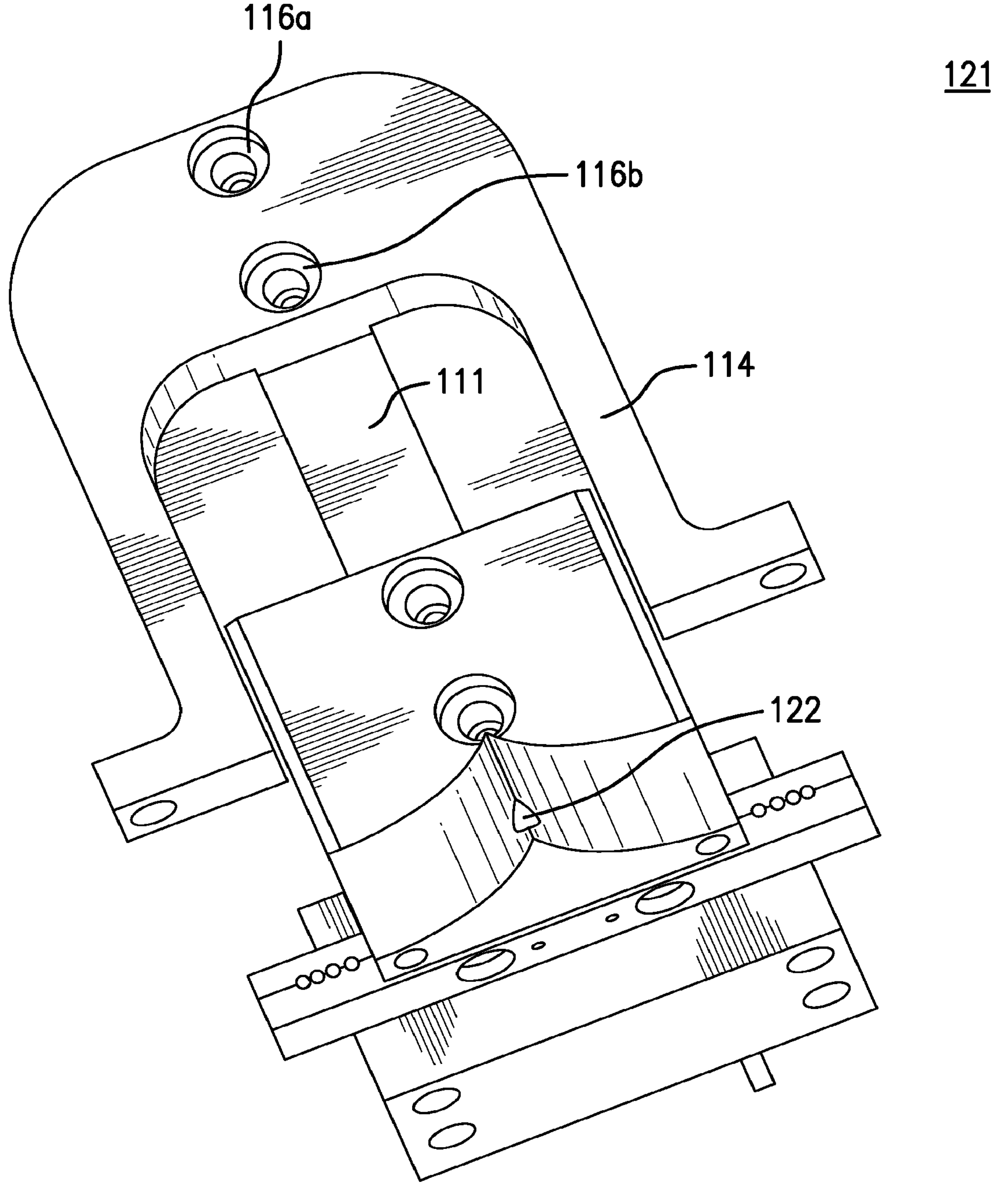
FIG. 5 is an illustration of an overhead view of the flexure assembly.

FIG. 5 shows an overhead view of the flexure assembly 121. As shown in FIG. 5, flexure mount 114 may be connected to flexure 111 by flexure mount connections 116*a* and 116*b*. Filament may be fed through filament feed opening 122. It is apparent from FIG. 5 that flexure 111 is only connected to flexure mount 114 at flexure mount connections 116*a* and/or 116*b*. Therefore, the liquefier 113 and the nozzle 119 are allowed to float up and down relative to the print head 112 during a print. For example, nozzle 110 may float up (towards the print head 112) when a resistance is encountered at a nozzle tip. The resistance may be caused by the nozzle tip contacting excess deposited material or by a collision of the nozzle tip with an imperfection in a 3D printed object. The ability for the nozzle 100 to float upward upon encountering an imperfection in a 3D printed object may prevent the nozzle 100 from breaking the 3D printed object.

Figure 6:
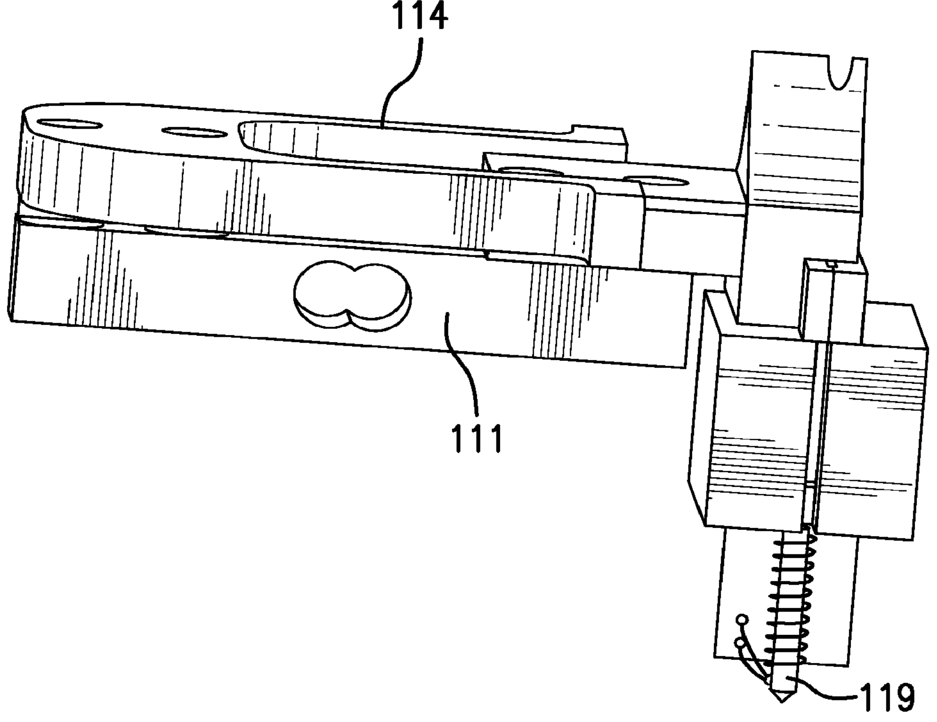
FIG. 6 is an illustration of a side view of the flexure assembly.

FIG. 6 shows a side view of an embodiment where the flexure 111 is a load cell that is connected to a flexure mount 114. A heated nozzle 119 may also be included.

The embodiments thus include the integration of a flexure between the liquefier and the hard mount of the print head to the X-Y motion. Design variations may include a flexure that is always in play; a flexure that may be turned on and off; and a flexure that may be subjected to a change in the rate of flex via a computer control system program executing a print plan or aspects thereof, therefore allowing a different flex amount depending on the process details at the head during the print. For example, FIG. 7 shows a flexure that may be able to flex by pivoting at the left side of the flexure 703. The flexure may be turned off by pinning the flexure to a stationary, non-flexing part of the print head. The flexure may be turned off manually or automatically. The flexure may be turned on or off prior to a print or during a print.

For example, FIG. 8 shows an actuator 803 that may move a roller 805 to adjust a distance (B) between the roller and the liquefier. By adjusting the distance (B), the stiffness of the flexure is adjusted. For example, decreasing the distance (B) results in a stiffer flexure. The distance (B) may be adjusted before a print or during a print and the actuator that moves the roller may be automated. The automated actuator may vary the flexure's stiffness during a print.

FIG. 9 shows an actuator 903 that may be used to adjust the flexure's stiffness. The actuator may be pneumatic and vary air pressure to change/vary the downward force applied to the flexure. When using a pneumatic actuator, the force is related to air pressure. The actuator may utilize a servomechanism or servomotor to vary the force applied to the flexure, thereby varying the flexure's stiffness. When using a servomechanism or servomotor, the force is controlled by the servomechanism or servomotor. The servomechanism or servomotor may be a linear servomechanism. The actuator may utilize a piezoelectric actuator to apply a variable force to the flexure, thereby varying the flexure's stiffness. When using a piezoelectric actuator, voltage is used to expand the size of the piezoelectric actuator, thereby changing the force applied to the flexure and changing the flexure's stiffness.

A key value for the flexure is during any speed up and slow down of the X-Y motion. As the print speeds up and slows down, the volume of material that is extruded from the nozzle will be more than needed for a perfect bead on the slow down and less than needed when the print head speeds up. Any rapid change in speed will gain advantage from the disclosed embodiments.

Figure 10:
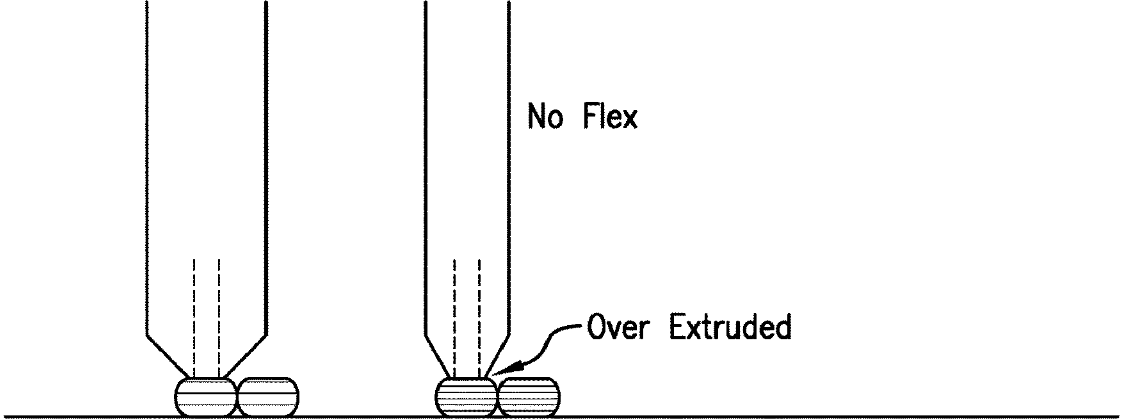
FIG. 10 illustrates aspects of the disclosed embodiments.
Figure 10:
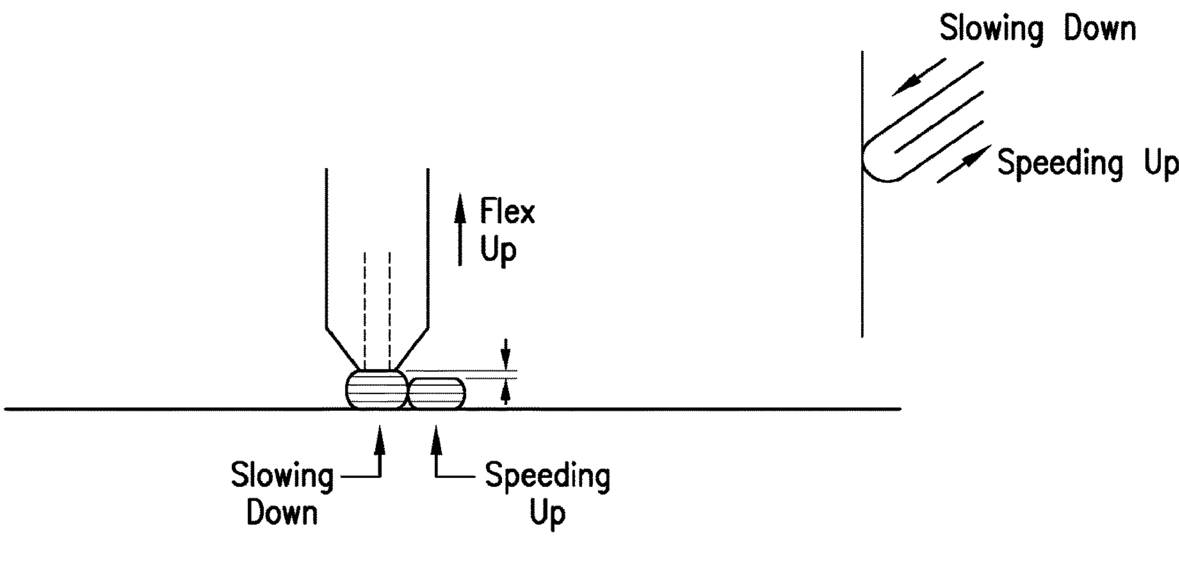
Figure 11:
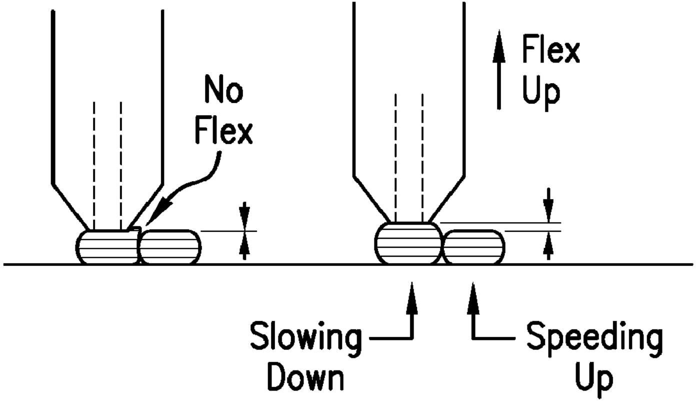
FIG. 11 illustrates aspects of the disclosed embodiments.

As the X-Y slows down for a turn, the extruder cannot slow down the material flow fast enough and the system over extrudes, produces more material than is required for the bead width. Without the flexure, the Z height of the nozzle tip stays the same and the material flows around it. If there is a bead next to it, the material will flow up in the Z direction, around the nozzle, creating sharp features along the path of the bead. This is shown in FIGS. 10 and 11.

As illustrated, the flexure allows the nozzle to move up in the Z direction, allowing the material to stay under the nozzle and allows it to be ironed cleanly. The result is a bead height that is a little taller, but the material is not forced to the side of the nozzle. So, the ultimate print is a lot smoother on top.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. A system for ironing of a 3D print, comprising:

a controllable print head for providing the 3D print;

a liquefier capable of liquefying deposit material for providing the 3D print;

a cantilevered liquefier nozzle flexure mounted between the controllable print head and the liquefier to change a distance between the print head and the liquefier by flexing when a resistance is encountered at a print nozzle tip.

2. The system of claim 1, wherein the nozzle flexure comprises a load cell.

3. A system for ironing of a 3D print, comprising:

a controllable print head for providing the 3D print;

a liquefier capable of liquefying deposit material for providing the 3D print;

a flexure having an adjustable stiffness mounted between the controllable print head and the liquefier to adjustably change a distance between the print head and the liquefier by variably flexing when a resistance is encountered at a print nozzle tip.

4. The system of claim 3 further comprising a roller to adjust the flexure stiffness.

5. The system of claim 4 further comprising an actuator to linearly move the roller.

6. The system of claim 5 further comprising a computer control system operatively coupled to the actuator to control the actuator automatically.

7. The system of claim 6, wherein the computer control system is configured to alter the adjustable stiffness of the flexure via the actuator by executing a print plan.

8. The system of claim 3, wherein a decreased change in the distance between the print head and the liquefier corresponds to an increase in the adjustable stiffness.

9. The system of claim 3, wherein an increased change in the distance between the print head and the liquefier corresponds to a decrease in the adjustable stiffness.

10. A system for ironing of a 3D print, comprising:

a controllable print head for providing the 3D print;

a liquefier capable of liquefying deposit material for providing the 3D print;

a pneumatic flexure having an adjustable stiffness mounted between the controllable print head and the liquefier to pneumatically change a distance between the print head and the liquefier when a resistance is encountered at a print nozzle tip.

11. The system of claim 10 further comprising an actuator to provide the pneumatic change in the distance between the print head and the liquefier.

12. The system of claim 11 further comprising a computer control system operatively coupled to the actuator to control the actuator automatically.

13. The system of claim 12, wherein the computer control system is configured to alter the adjustable stiffness of the pneumatic flexure via the actuator by executing a print plan.

14. The system of claim 11, wherein the actuator utilizes a servomechanism or servomotor to apply a variable force to the pneumatic flexure to adjust the stiffness.

15. The system of claim 11, wherein the actuator comprises a piezoelectric actuator to apply a variable force to the pneumatic flexure to adjust the stiffness.

16. The system of claim 15, wherein the piezoelectric actuator is applied voltage thereto to expand a size of the piezoelectric actuator to apply the variable force to the pneumatic flexure.

17. The system of claim 10, wherein an increase in the pneumatic change corresponds to an increased stiffness to the adjustable stiffness.

18. The system of claim 10, wherein a decrease in the pneumatic change corresponds to an decreased stiffness to the adjustable stiffness.

19. The system of claim 3, wherein the flexure is configured to be turned off by pinning the flexure to a stationary, non-flexing part of the print head.

20. The system of claim 19, wherein the flexure is turned off manually or automatically and the flexure may be turned on or off prior to a print or during a print.

* * * * *